United States Patent [19]

Keeton

[11] Patent Number: 5,027,725
[45] Date of Patent: Jul. 2, 1991

[54] SEED DISPENSER FOR PLANTERS

[76] Inventor: Eugene G. Keeton, 2180 Bells Chapel Rd., Trenton, Ky. 42286

[21] Appl. No.: 532,287

[22] Filed: Jun. 1, 1990

Related U.S. Application Data

[63] Continuation of Ser. No. 337,718, Apr. 13, 1989, abandoned.

[51] Int. Cl.$^5$ .................................................. A01C 7/04
[52] U.S. Cl. ........................................ 111/184; 111/77
[58] Field of Search ............... 221/222, 260, 277, 266, 221/263, 278, 211; 111/184, 183, 77, 177, 178, 185

[56] References Cited

U.S. PATENT DOCUMENTS

| | | | |
|---|---|---|---|
| 1,097,064 | 5/1914 | Suggs | 111/184 X |
| 2,926,819 | 3/1960 | Burch | 111/183 X |
| 3,741,437 | 6/1973 | Ward | 111/184 X |
| 4,162,744 | 7/1979 | Barker et al. | 111/77 X |

FOREIGN PATENT DOCUMENTS 2073565 10/1981 United Kingdom ............... 111/184

Primary Examiner—Danton D. DeMille
Attorney, Agent, or Firm—Rockey & Rifkin

[57] ABSTRACT

A seed dispenser is provided for an agricultural planter and is designed to dispense seeds of substantially uniform size and shape, to which end the dispenser has a drum-like casing provided with horizontally spaced apart upright walls spanned and joined by a cylindrical wall that together define a seed-receiving chamber within which runs a circular plate or disk whose rim is formed with seed cells of uniform size and shape according to the size and shape of the seeds, the cells being uniformly angularly spaced about the rim of the plate and adapted to pick up seeds, one per cell, at the lower part of the chamber and to convey to seeds upwardly and around and past the upper portion of the chamber, ultimately releasing the seeds through an outlet opening for discharge to the ground.

9 Claims, 4 Drawing Sheets

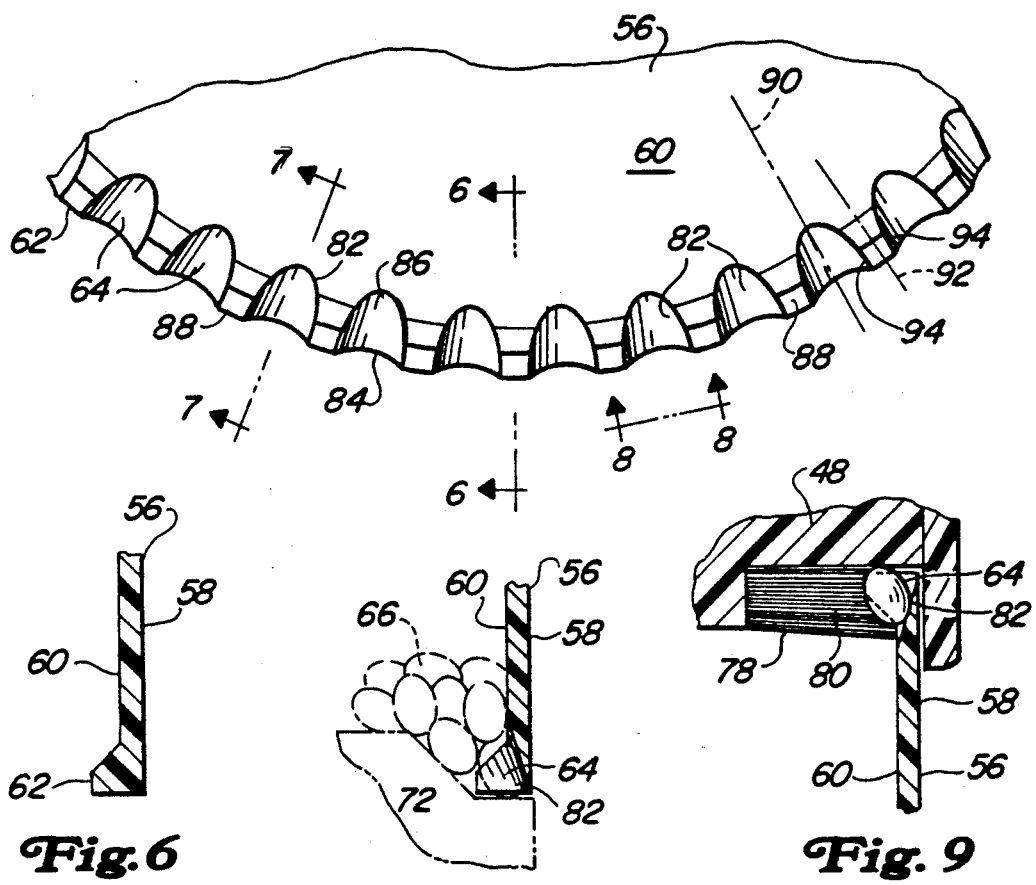

SEED DISPENSER FOR PLANTERS

This application is a continuation of application Ser. No. 337,718, filed Apr. 13, 1989, now abandoned.

BACKGROUND AND SUMMARY OF THE INVENTION

Seed dispensers of many types are of course known in the agricultural planter art. Many dispensers operate on the basis of a seed can having a horizontal bottom in which a seed plate rotates on a vertical axis as the planter advances over the field. The seed plate is formed with a circular series of seed cells sized and shaped according to the seed to be planted so that normally one seed per cell is dropped according to the speed of rotation of the seed plate. Problems occur in dispensers of this type when hilly terrain is encountered. Other problems arise when more than one seed becomes carried by one cell. Efforts to overcome these and other problems have been made by resort to dispensers whose seed plates turn on horizontal axes, but so far as is known, none of these dispensers has been able to function accurately and efficiently.

According to the present invention, the foregoing and other drawbacks have been eliminated in a novel design of dispenser including a casing forming a seed-containing chamber within which a seed plate or disk turns on a horizontal axis and has a rim formed with equally angularly spaced-apart seed-receiving cells of uniform size and shape according to the size and shape of the seed to be dispensed and planted. It is a feature of the invention that the casing and seed plate cooperate to function efficiently and accurately despite rather marked unevenness in the terrain. The interior of the casing is configured to assure that seeds are positively delivered at the lower part of the chamber to the lower cells of the plate as that part of the plate passes through the lower quantity of seeds. A further feature is the provision of means confining the cell-received seeds to the cells as the cells pass around the interior of the casing to be released at a discharge or outlet opening. A still further feature of the invention stems from the shape of the cells so that the seeds are accurately picked up and retained by the cells but are released from the cells at the proper interval without carry-over. The design features simplicity and substantially fool-proof operation.

Features and advantages other than those noted above will occur as a preferred embodiment of the invention is disclosed in detail in the ensuing description and accompanying drawings.

DESCRIPTION OF THE DRAWINGS

FIG. 5 is an enlarged elevation of the lower part of the seed plate and illustrates the configuration of the seed cells.

FIG. 6 is a section on the line 6—6 of FIG. 5.

FIG. 7 is a section on the line 7—7 of FIG. 5.

FIG. 8 is an enlarged view of a cell as seen along the line 8—8 of FIG. 5.

FIG. 9 is an enlarged section as seen along the line 9—9 of FIG. 4.

DETAILED DESCRIPTION OF A PREFERRED EMBODIMENT OF THE INVENTION

Figure 1:
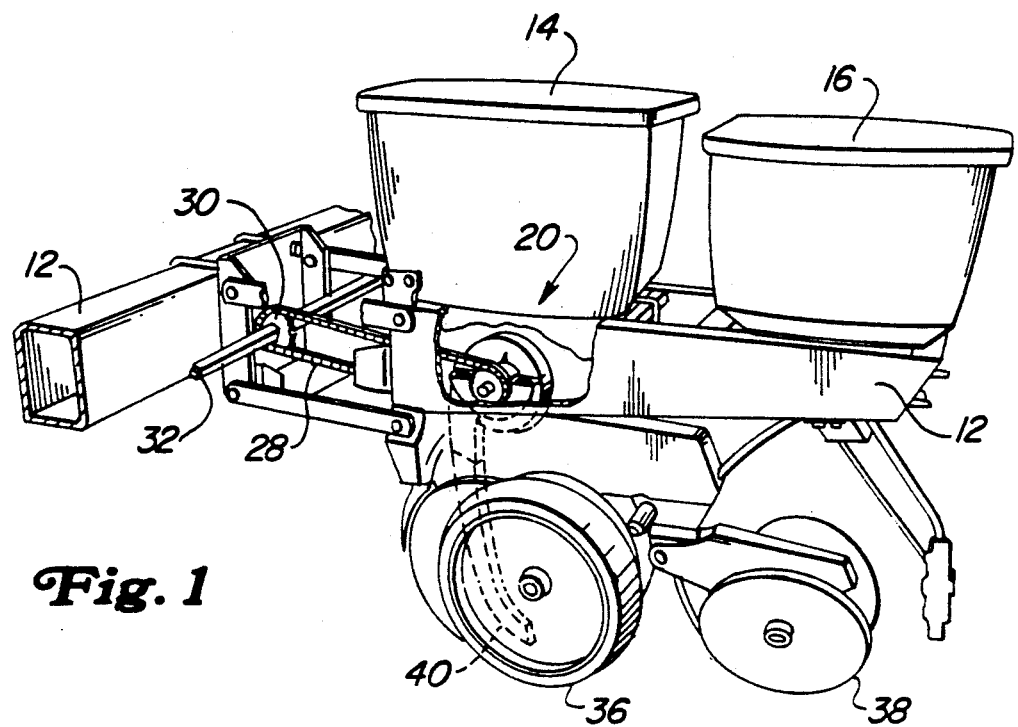
FIG. 1 is a perspective of a typical planter equipped with the inventive dispenser.
Figure 2:
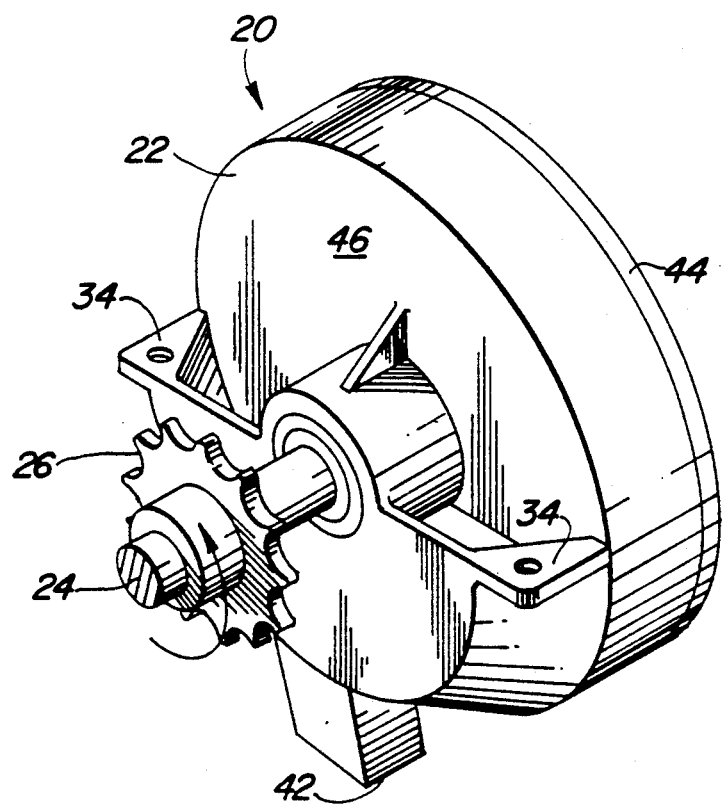
FIG. 2 is an enlarged perspective of the dispenser per se as seen generally in the attitude it occupies in FIG. 1.

Reference will be had first to FIG. 1 for an overview of what is involved. In that figure, a planter of typical construction is shown as having a transverse tool bar 12 from which a planter frame 14 extends in trailing relation and carries a seed hopper 16 and a fertilizer hopper 18. A portion of the frame or shielding is broken away to expose the inventive dispenser, designated in its entirety by the numeral 20. The dispenser exterior is represented by a casing 22, which may be of any suitable material, the cross-hatching subsequently to appear herein being but representative and not limiting. The casing journals a shaft 24 for rotation about a horizontal axis and a sprocket 26 is fixed to the shaft to receive a chain 28 driven from a sprocket 30 fixed to a shaft 32 carried by the tool bar 12 and driven in any fashion not significant here. The forward travel of the planter is to the left as seen in FIGS. 1 and 2 and the direction of rotation on the shaft 24 is indicated by the arrow in FIG. 2.

The casing may be supported by the frame in any manner and is disposed beneath the seed hopper 14 to receive seed therefrom, as will be explained in greater detail later herein. As seen in FIG. 2, the casing has external apertured ears 34 which suggest one way in which the casing may be carried by the planter. As seen in FIG. 1, the planter includes furrow wheels 36 trailed by covering disks 38. A seed delivery tube 40 is shown in dotted lines in FIG. 1 and a casing-carried connecting leader 42 is shown in full lines in FIG. 2.

Figure 3:
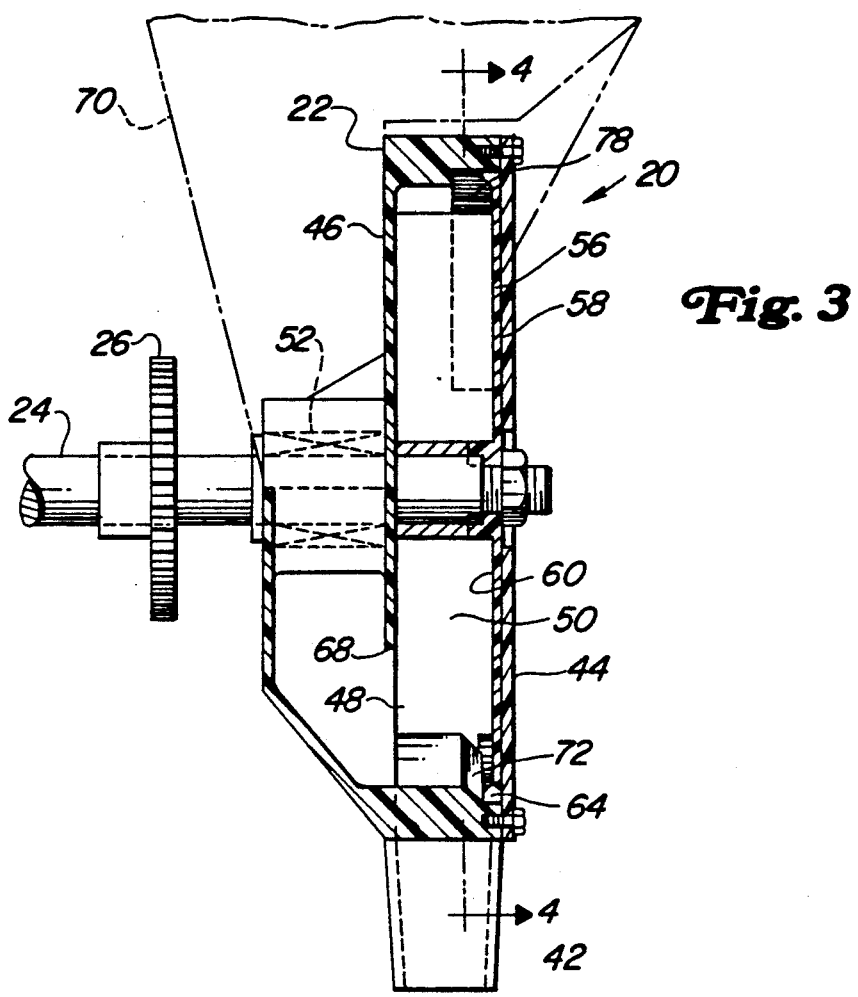
FIG. 3 is a vertical section through the dispenser.
Figure 4:
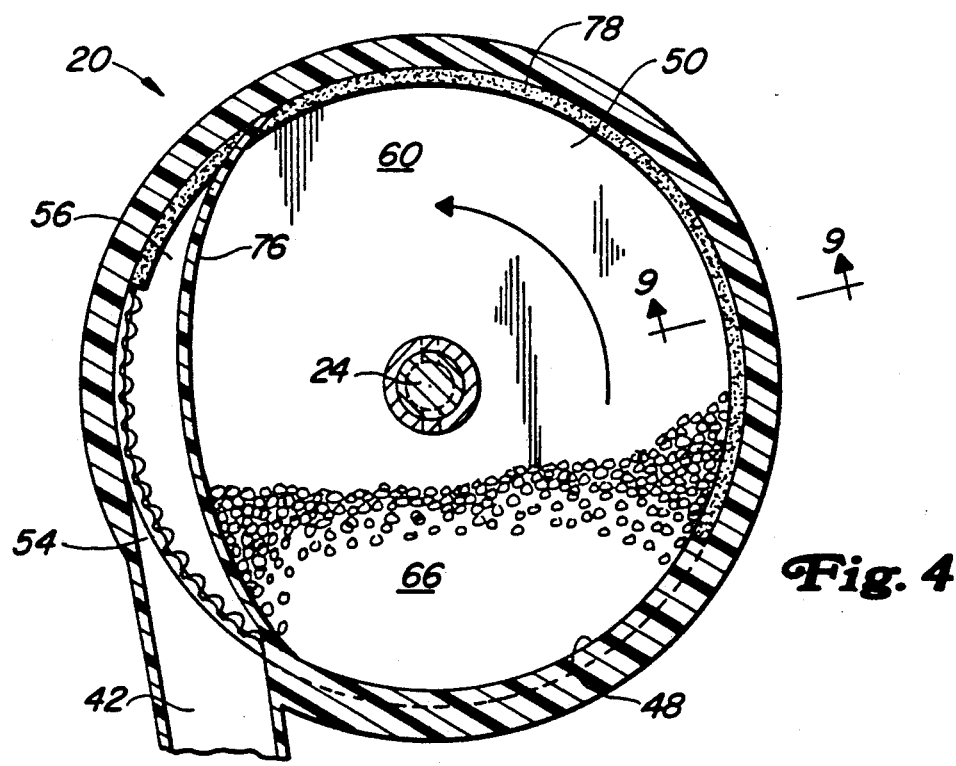
FIG. 4 is a section on the line 4—4 of FIG. 3.
Figure 10:
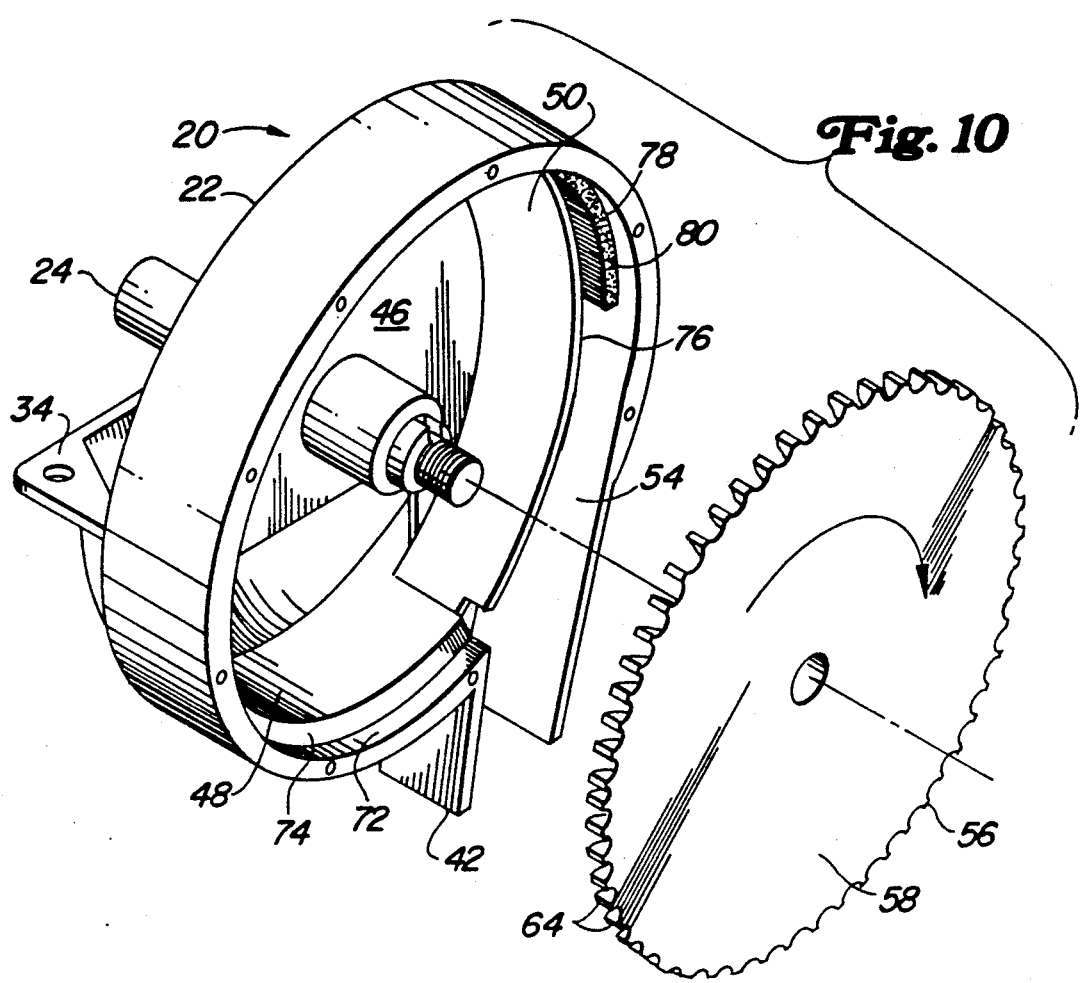
FIG. 10 is an exploded perspective of the dispenser casing and plate.
Figure 11:
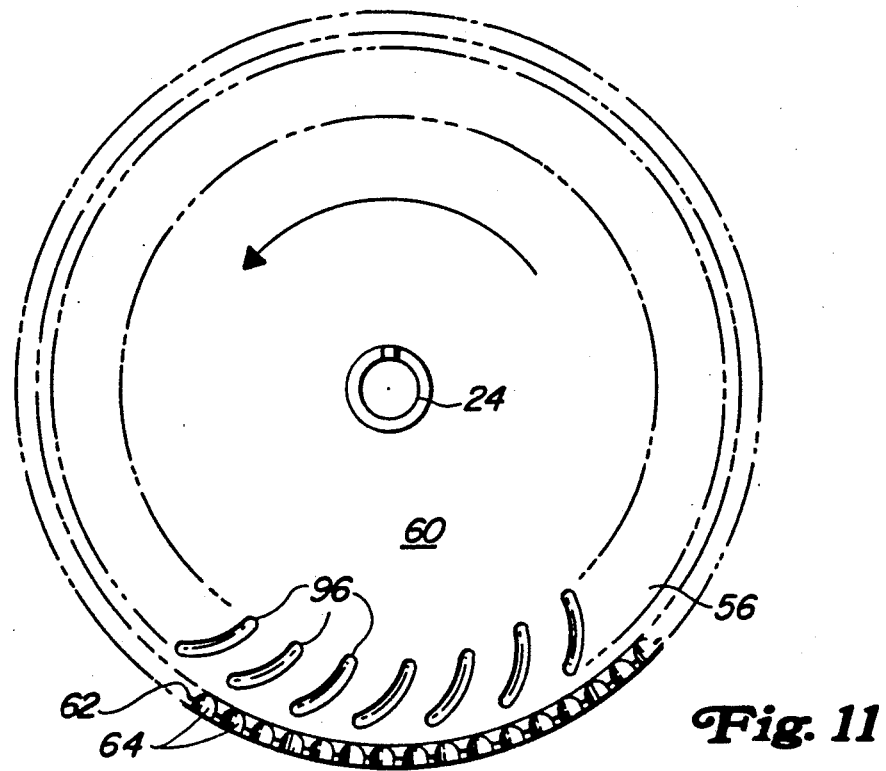
FIG. 11 is a face view of a portion of the plate as seen from the side opposite to that seen in FIG. 10.

Reference will now be had to FIGS. 3, 4 and 10. As best seen in these figures, the casing 22 comprises first and second upright side walls 44 and 46 spanned by and rigidly joined to a peripheral or cylindrical wall 48, the whole affording a drum-like chamber 50. The shaft 24 extends across the chamber and through the side walls and is journalled in the casing by a suitable bearing 52 (FIG. 3). Designation of the parts thus far and subsequently as being upright, horizontal, etc., is for the purposes of clarity and not limitation. The same is true of reference to rotation of the shaft 24 as being clockwise as seen in FIG. 10, since description is facilitated thereby, it being observed, of course, that the rotation direction is counterclockwise as seen in FIGS. 1, 4 and 6 because of being viewed from the left side of the planter.

As seen in FIGS. 4 and 10, the cylindrical wall 48 is interrupted by an outlet opening 54 that leads downwardly to the seed tube connector 42. Considering FIG. 10 and clockwise rotation of the shaft, the outlet may be regarded as disposed at about between four/five o'clock, which is a preferred location but which may be varied within operative limits so long as good results are obtained.

A circular seed plate or disk 56 is keyed to the shaft 24 and rotates according to the shaft and occupies a position close to or face-to-face with the first side wall 44 of the casing. The plate has its first face 58 in close running relation to the side wall 44 and its opposite second face 60 facing or exposed to the casing chamber 50. The side wall 44 is detachable from the casing so as to afford access to the casing chamber, as for replacing the plate according to differences in size of seed, etc. The plate has a peripheral rim 62 in the form of a flange that extends axially inwardly to the casing chamber. This rim is provided with a series of seed-receiving cells 64 that are of uniform size and shape and are uniformly angularly spaced about the rim flange. The diameter of the plate 56 is such that it has close running relation to the cylindrical casing wall 48. As will appear shortly, the cylindrical wall 48 and the rim of the plate 56 are relatively so configured that seeds 66 contained in quantity in the chamber 50 are picked up by the cells at the lower part of the plate as the plate rotates and carries the pickup-up seeds around the upper part of the chamber for discharge via the outlet opening 54. The seeds are supplied to the chamber via an inlet 68 in the casing wall 46 by means of a funnel-like structure 70 leading from the hopper 14, as seen in FIG. 3. The location of the inlet 68 substantially determines the level of seed in the chamber, here shown as an amount to fill the lower part of the chamber (FIG. 4).

The lower part of the cylindrical wall 48 is configured in such fashion as to provide gutter 72 in which the lower part of the seed plate travels (FIGS. 3 and 7). This configuration results from giving the lower part of the cylindrical wall a slope 74 axially and downwardly toward the plate 56 (FIG. 10) whereby the seeds gravitate or are influenced toward the cells and thus enter the cells to be carried about the chamber as described. The provision of the gutter assures that the seeds will enter the plate cells even on side-hill slopes of the type normally encountered in planting.

In order that the seeds in the chamber do not enter the discharge outlet 54 except via the plate, a partition 76 is provided (FIGS. 4 and 10). This rises from the cylindrical wall at about five o'clock (FIG. 10) and extends toward the upper part of the chamber sufficiently to block off the opening 54 from the main part of the chamber. As best seen in FIG. 10, the partition extends from a lower end at about the sloped or gutter part 72/74 of the cylindrical wall 48. Although the partition is shown as being adjacent to the upper part of the cylindrical wall, it need not be that high but that height is preferred to insure that seeds from the chamber do not stray into the outlet opening 54, especially during operation of the planter on downhill slopes. In those cases where the partition extends to the peripheral wall, it may be notched (not shown) to accommodate the brush means which, preferably, extends angularly past the partition so as to assure delivery of seeds to the delivery outlet.

Now to insure that the seeds picked up by the cells as the rim of the plate 56 moves through the gutter 72 do not drop out of the cells as the plate continues its travel, seed-confining means 78 is provided, made up here of an arcuate brush within and fixedly carried by the housing, as by the cylindrical wall 48, for example, and having bristles 80 acting axially against the cell-received seeds (FIG. 9). The means 78 has a circumferential extent best seen in FIGS. 4 and 10, starting below the level of the quantity of seeds and extending rotation-wise and terminating at about the discharge opening at which point the seeds are free to drop out of the cells for downward discharge through the outlet opening 54. That is to say, the seeds cannot drop from the upper cells back into the chamber.

As previously noted herein, the cells are shaped and sized according to the seeds to be dispensed. The dispenser is intended primarily for the dispensing of seeds of relatively smooth, round or oval shapes, such as milo and beans. It should be observed of course, that different plates will be used for different sized seeds; e.g., larger seeds will require a plate having correspondingly larger cells.

In any event, the cells according to the present invention are so designed as to accurately and efficiently dispense the seeds for which the plate is selected. Contributing materially to the desired result is the configuration of the cells in such fashion that each cell picks up one seed, retains it until the proper discharge point is attained and releases it without carry-over. FIGS. 5–9 will now be considered as to cell configuration.

As best seen in FIG. 5, each cell is in the form of a pocket 82 existing in the plate rim 62 as well as in part of the plate face 60, the pocket opening radially outwardly at an enlarged end 84 as compared to its smaller end 86, shown dimensionally in FIG. 8. Each pocket or cell is centered on a radius of the plate, as is each partition 88 between neighboring cells or pockets. In FIG. 5, the radius that is the centerline of one pocket is shown at 90 and the radius centerline for an adjacent partition is seen at 92. Although the partitions are shaped to provide the sides of the pockets which are generally convergent toward the plate axis to provide the dimensions 84 and 86, there are nevertheless straight side portions 94 for the partitions that are parallel to the radius on which the particular partition is centered. These straight side parts, in conjunction with the inwardly convergent shape of the pocket, insure clean discharge of the seed at the point where the seeds are released by the brush 78, thus eliminating carry-over or hang-up of the seed.

In order to agitate the seeds in the chamber, the plate 48 carries or is provided with agitating means, here in the form of equi-angularly spaced arcuate grooves 96.

A further feature is that centrifugal force is exploited to assure fast delivery of the seeds to ground; i.e., the faster the planter advances over the field, the faster the plate or disk rotates to sweep the seeds toward and out of the delivery opening.

As will be seen from the foregoing, the dispenser is simple and designed for long life and efficient and accurate operation. Although the parts have been described with reference to certain parameters of orientation, it is obvious that the structure may partake of other attitudes, all of which, along with features in addition to those stressed herein, will become apparent to those versed in the art, all without departure from the spirit and scope of the invention.

I claim:

1. A mechanical planter meter operative without the assistance of pneumatic pressure for isolating seeds of substantially uniform size and shape of essentially smooth spherical or ovoid character comprising:

a housing means providing a seed inlet and a seed discharge opening;

a circular plate having opposing faces with one face cooperating with said housing means to define a chamber; means for introducing seeds through said inlet to said one face such that a quantity of seeds is stored in said chamber up to a predetermined level; means mounting said plate to said housing means for rotation in a vertical plane;

said plate having a plurality of seed receiving cells on said one face open outwardly from said one face and open to the chamber;

said cells uniformly angularly spaced about the periphery of said plate and uniformly sized to contain a single seed;

said cells in communication with said chamber whereby as said plate is rotated each cell passes downwardly into said quantity of seeds in said chamber and thence through and upwardly above said quantity of seeds such that one seed is in each cell;

said housing means further providing means for separating said discharge opening from communication with said quantity of seeds stored in said chamber;

and a stationary flexible brush extending continuously around the periphery of said housing means immediately adjacent the said seed cells and cooperating with said cells, said plate and said housing to axially retain said seeds in said cells, said brush starting where seeds are seated in said cells in said quantity of seeds to a second end closely adjacent said discharge opening where said seeds pass through said discharge opening.

2. The mechanical planter meter according to claim 1, in which the plurality of seed-receiving cells comprises a single annulus.

3. A mechanical planter meter according to claim 2, in which each seed cell further faces radially outwardly from the plate.

4. A mechanical planter meter according to claim 3, in which each cell is centered on a radius of the plate and is in the form of a U-shaped pocket opening to the chamber.

5. A mechanical planter meter according to claim 4, in which each cell is separated from its neighbor by a partition and each partition is centered on a radius midway between two adjoining cells.

6. A mechanical planter meter according to claim 5, in which each partition has angularly spaced apart portions defining the sides of the associated pocket and the radially outermost parts of said portions are straight and parallel to the radius on which the partition is centered.

7. A mechanical planter meter according to claim 6, in which the aforesaid portions of the partitions radially inwardly of the straight parts are configured to provide the pockets with radially inwardly diverging sides.

8. A mechanical planter meter according to claim 5, in which each pocket opens axially to the chamber as well as radially outwardly.

9. A mechanical planter meter according to claim 1, in which the housing has a cylindrical wall closely concentric with and surrounding the periphery of the plate and a lower part of said wall is configured to cause seeds in the chamber to gravitate toward the seed cells.

* * * * *